United States Patent
Bons et al.

(10) Patent No.: US 10,174,214 B2
(45) Date of Patent: Jan. 8, 2019

(54) DETERGENT FOR GENTLE REMOVAL OF INKS AND MARKERS

(71) Applicant: Chemetall GmbH, Frankfurt/M (DE)

(72) Inventors: Peter Bons, Reichelsheim (DE); Rüdiger Rein, Bad Vilbel (DE); Jörg Wörner, Bruchköbel (DE); Miriam Corneli, Hattersheim (DE)

(73) Assignee: Chemetall GmbH, Frankfurt/M (DE)

( * ) Notice: Subject to any disclaimer, the term of this patent is extended or adjusted under 35 U.S.C. 154(b) by 0 days.

(21) Appl. No.: 15/314,575

(22) PCT Filed: Jun. 16, 2015

(86) PCT No.: PCT/EP2015/063418
§ 371 (c)(1),
(2) Date: Nov. 29, 2016

(87) PCT Pub. No.: WO2015/193280
PCT Pub. Date: Dec. 23, 2015

(65) Prior Publication Data
US 2017/0174912 A1    Jun. 22, 2017

(30) Foreign Application Priority Data

Jun. 17, 2014 (DE) .................. 10 2014 211 584

(51) Int. Cl.
| | | |
|---|---|---|
| *C11D 7/50* | (2006.01) | |
| *C09D 9/00* | (2006.01) | |
| *C11D 1/02* | (2006.01) | |
| *C11D 1/66* | (2006.01) | |
| *C11D 1/83* | (2006.01) | |
| *C11D 3/43* | (2006.01) | |
| *C11D 11/00* | (2006.01) | |
| *C09D 9/04* | (2006.01) | |

(52) U.S. Cl.
CPC ............... *C09D 9/005* (2013.01); *C09D 9/04* (2013.01); *C11D 1/02* (2013.01); *C11D 1/66* (2013.01); *C11D 1/83* (2013.01); *C11D 3/43* (2013.01); *C11D 11/0029* (2013.01)

(58) Field of Classification Search
CPC ...... C11D 17/0021; C11D 3/2093; C11D 3/43
USPC ................................................. 510/417, 170
See application file for complete search history.

(56) References Cited

U.S. PATENT DOCUMENTS

| | | | | |
|---|---|---|---|---|
| 5,773,395 A | * | 6/1998 | Charlez ................ | C11D 3/2068 510/101 |
| 5,944,908 A | | 8/1999 | Jarema et al. | |
| 6,281,182 B1 | | 8/2001 | Leonard et al. | |
| 2001/0009893 A1 | | 7/2001 | Leonard et al. | |
| 2006/0089281 A1 | * | 4/2006 | Gibson ................ | C09D 9/005 510/201 |
| 2011/0312870 A1 | * | 12/2011 | Beatty ................ | C11D 17/0021 510/417 |

FOREIGN PATENT DOCUMENTS

| | | |
|---|---|---|
| DE | 102004057623 A1 | 6/2006 |
| EP | 1927651 A1 | 6/2008 |
| WO | WO 2012084150 A1 | 6/2012 |

* cited by examiner

*Primary Examiner* — Gregory E Webb
(74) *Attorney, Agent, or Firm* — Armstrong Teasdale LLP

(57) ABSTRACT

The invention relates to a detergent for gentle removal of inks as used for marking in a roll mill, and to markers as used in production for temporary marking. According to the invention, the problem is solved by a detergent which permits the gentle removal of inks or markers from metallic surfaces in the form of a concentrate or a cleaning bath solution containing at least one water-immiscible solvent in an amount of 4 to 200 g/l, at least one anionic and/or nonionic surfactant in an amount of 8-300 g/l, at least one complexing agent in an amount of 1-100 g/l, at least one buffer substance in an amount of 1-100 g/l and at least one water-miscible solvent in an amount of 4-200 g/l in water.

17 Claims, No Drawings

DETERGENT FOR GENTLE REMOVAL OF INKS AND MARKERS

CROSS-REFERENCE TO RELATED APPLICATIONS

This is a National Stage entry of International Patent Application PCT/EP2015/063418, filed on Jun. 16, 2015, which application claims priority from German Application No. 10 2014 211 584.1, filed Jun. 17, 2014. Each patent application identified above is incorporated herein by reference in its entirety.

FIELD

The invention relates to a detergent for the gentle removal of inks as used for marking in a roll mill, as well as to markers as used in the production of temporary marking.

BACKGROUND

Inks and markers are frequently removed by manual cleaning using rapidly evaporating solvents prior to the actual automated aqueous cleaning of the surface. The disadvantage of this process step is an enhanced risk due to the release of highly flammable substances and the risk of injury to persons during the application thereof. Moreover, the use of these solvents also has a negative impact on the environment due to so-called "VOC" (VOC or VOCs is an acronym for volatile organic compound[s]). Further, in the case of the conventionally used detergents, a significant amount of erosion of metallic substrate occurs during the removal of inks and markers.

It is an object of the invention to propose a detergent that allows the gentle removal of inks and markers from metallic surfaces. A "gentle removal" in terms of the present invention is understood to be an "erosion-free" treatment of the substrate with a metallic surface, wherein an erosion of metallic substrate amounts to less than 0.1 µm/h.

Further, if used as a cleaning bath, the detergent should take on the function of a separate/manual pre-cleaning.

Further, the detergent according to the invention should be suitable for cleaning metallic surfaces that may be contaminated with non-polar organic contaminants such as oil(s) and/or other predominantly or entirely organic contaminants such as grease(s), soap(s) and/or further metal processing agent(s) such as for example drawing additives including anionic organic compounds and particle impurities.

DESCRIPTION

According to the invention, this object is achieved by means of a detergent that allows the gentle removal of inks and markers from metallic surfaces in the form of a concentrate or a cleaning bath solution, which contains at least one water-immiscible solvent in an amount of 4 to 200 g/l, at least one anionic and/or nonionic surfactant in an amount of 8 to 300 g/l, at least one complexing agent in an amount of 1 to 100 g/l, at least one buffer substance in an amount of 1 to 100 g/l and at least one water-miscible solvent in an amount of 4 to 200 g/l in water. The water-insoluble solvent component integrates and stabilizes the aqueous process. The solvent component used has a high boiling point, so that no volatilization takes place at application temperatures. During the application of the detergent, a rate of erosion of metallic substrate of less than 0.1 µm/h has been found.

Preferably, the detergent is one that contains at least one water-immiscible solvent of the class of ester and/or ether compounds. These are selected from the group consisting of hydroxycarboxylic acid esters and glycol monoethers. Particularly preferred are lactic acid esters esterified with $C_2$-$C_8$ alcohol.

The detergent is preferably further one that contains at least one oil-in-water emulsifying surfactant of nonionic surfactants and/or of anionic surfactants. The surfactant preferably has an HLB value in a range of 5 to 16, particularly preferably an HLB value of 6 to 14, especially one with an HLB value <13. An HLB value (hydrophilic-lipophilic balance) is understood to be the ratio between the hydrophilic and the lipophilic proportion of predominantly nonionic surfactants according to W. C. Griffin.

Particularly preferred is a detergent that contains at least one component for pH value stabilization. The detergents according to the invention are free of borate (silicate), which is understood to mean, according to the present invention, a content of >100 ppm of borates (silicates).

The detergent preferably contains a corrosion inhibitor and/or at least one further additive selected from the group consisting of biocides, defoamers and/or pickle inhibitors.

The overall content of all active ingredients in the cleaning bath containing the detergent is preferably in a range of 10 to 200 g/l.

Preferably, the detergent as a cleaning bath is diluted with water in a ratio of 1:1 to 1:20.

The detergent may be used in cleaning baths that are contaminated with oils, further non-polar organic compounds of the group consisting of greases, soaps, particle impurities and/or anionic organic compounds.

The detergent may be used in cleaning methods involving immersion, spraying and/or brushing. It is preferably used for cleaning substrates having metallic surfaces of iron, steel, stainless steel, galvanized steel, metallically coated steel, aluminium, magnesium, titanium and/or the alloys thereof. Particularly preferably it is used for cleaning substrates in the form of metal sheets, components and/or composite components of various substrates.

According to the invention, the detergent is used for generating cleaned substrates prior to phosphating and/or prior to anodizing, prior to coating with a treatment or pre-treatment composition on the basis of silane/siloxane/polysiloxane, titanium/zirconium compound, iron oxide/cobalt oxide, chromate, oxalate, phosphonate/phosphate and/or an organic polymer/copolymer and/or prior to coating with at least one composition on the basis of a substantially organic polymeric composition, with a welding primer, with a galvanic coating, with an enamel coating, with a CVD coating, with a PVD coating and/or with a temporary anti-corrosive coating. This may be carried out in particular (a) prior to the anodization and/or prior to the chemical surface treatment, (b) prior to the so-called pre-treatment of metallic surfaces of a substrate, e.g. prior to painting for example with a pre-treatment composition (conversion treatment) such as for example using Cr(III), (c) prior to the use of an industrial washing installation and/or (d) as intermediate cleaning for example prior to a subassembly.

In the following, no distinction is made between a bath, a bath solution and a cleaning bath, and therefore the term "bath" is mostly used. Here, this term comprises for example also a solution that is applied for example by spraying.

The aqueous solvent/surfactant-containing bath as used for cleaning preferably has a pH value in a range of pH 4 to 10, in particular in a range of pH 5 to 9, particularly preferably in a range of pH 6 to 8.

The inks and markers used in practice are today mixes with a very complex composition, which have a multiplicity of different substances apart from components of the carrier medium, such as for example solvents and aqueous mixes.

As oils that may contribute to the contamination of the bath, naphthenic and/or aliphatic oils may be used. These oils could best be referred to as processing oils. They may in certain circumstances also be referred to as quenching oils, hardening oils, honing oils, anti-corrosion oils, cooling lubricant emulsions, cooling lubricant oils, cutting oils and/or deformation oils.

It has surprisingly been found that by adding a solvent/surfactant mix, the cleaning performance on inks and/or markers may be maintained.

The contents of non-volatile solvents in the cleaning bath are preferably in a range of 1 to 50 g/l, particularly preferably in a range of 2 to 40 g/l, particularly preferably in a range of 3 to 30 g/l.

In the method according to the invention, at least one solvent is preferably selected from the group of water-insoluble solvents, in particular at least one that is based on an ester and/or ether compound. Further, it contains a surfactant from the group of nonionic or anionic surfactants.

In many embodiment variants it is advantageous if the cleaning bath additionally contains one cleaner scaffolding, i.e. at least one scaffolding substance, and/or if the latter is added to the bath. The cleaner scaffolding can help to prevent a modification of the pH value. The cleaner scaffolding is preferably at least one scaffolding substance on the basis of organic buffer substances, e.g. glycine, at least one alkaline medium, e.g. on the basis of alkanolamine such as e.g. on the basis of monoalkylamine(s), trialkylamine(s), monoalkanolamine(s) and/or trialkanolamine(s), such as e.g. monoethanolamine, triethanolamine, methyldiethanolamine and/or at least one complexing agent such as e.g. on the basis of carboxylate(s), such as e.g. gluconate and/or heptonate, sodium salt of nitrilotriacetic acid (NTA) and/or phosphonate(s), such as e.g. 1-hydroxyethane (1,1-diphosphonic acid) (HEDP). The content of scaffolding substance is in particular in a range of 0.1 to 290 g/l, preferably of 0.2 to 120 g/l, particularly preferably in a range of 0.5 or of 1 to 100 g/l and especially preferably in a range of 1.5 to 48 g/l. Here, contents of scaffolding substances are used in a spray method in a range of 1 to 50 g/l, in immersion methods in a range of 2 to 100 g/l, usually as a function of whether it is a continuous or a discontinuous process.

Moreover, also at least one additive such as e.g. at least one biocide and/or at least one defoamer may be contained in the bath and/or may be added to the bath, in particular in each case in a range of 0.01 to 0.5 g/l. Further, the bath may also contain at least one pickling inhibitor and/or may be added thereto. Pickling inhibitors help to reduce or prevent the attack of the cleaning bath in particular in the case of surfaces of aluminium, magnesium, zinc and/or the alloys thereof. They often act quite selectively as a function of the type of metallic surfaces to be protected, so that they are partially used in certain mixtures. The bath content of the pickling inhibitors is here preferably in a range of 0.01 to 10 g/l, particularly preferably in a range of 0.1 to 8 g/l. As pickling inhibitor(s), inter alia, phosphonate(s) and phosphorous acid esters may be used.

The overall content of all active ingredients in the bath is in a range of 1 to 300 g/l, preferably in a range of 2 to 250 g/l, particularly preferably in a range of 3 to 200 g/l. In particular, for the cleaning of assemblies, metal sheets and/or components prior to anodization, it may in particular be in a range of 3 to 150 g/l in the case of spray methods, in particular in a range of 3 to 200 g/l in the case of immersion processes.

Depending on the installation it may be sufficient to use one cleaning zone (bath) or only part of the various cleaning zones (cleaning baths), in particular if in this way the other cleaning zones are not loaded any more with contaminations.

The bath solution may here be applied also in at least one cleaning zone, for example by spraying and/or by spraying and brushing. When immersed, the at least one substrate may, if necessary, also be electrolytically treated, i.e. by electrolytic cleaning.

In the cleaning processes, the applied pressure is often substantially atmospheric pressure, apart from pressures during circulation methods, e.g. in injection flooding processes (if necessary up to approximately 50 bar), whilst during spray processes, spray pressures in a range of 0.1 to 5 bar are often used. In the cleaning processes, the temperatures are, partially dependent on the chemical composition, preferably in a range of 5 to 90° C., particularly preferably in a range of 10 to 80° C., wherein spray processes are often applied in a range of 30 to 70° C. and immersion processes in a range of 30 to 90° C.

The nonionic surfactants typically have an HLB value (hydrophilic-lipophilic balance) in a range of 5 to 16, often in a range of 6 to 15. Surfactants have a stabilizing effect preferably at HLB values <14, in particular those <13, on the water-insoluble solvent.

In the method according to the invention, preferably substrates in the form of metal sheets, parts and/or composite components are cleaned. In general, the substrates that are cleaned according to the invention preferably have metallic surfaces of iron, steel, stainless steel, galvanized steel, mechanically coated steel, aluminium, magnesium, titanium and/or the alloys thereof.

It has surprisingly been found when using the detergent according to the invention in a cleaning method that in this way even an erosion-free, at least 40% removal of inks and markers from the metallic substrate could be ensured without any problems and in a simple manner. The term "erosion-free" in terms of the present invention is understood to be an erosion of metallic substrate of less than 0.1 μm/h.

Cleaning may here in particular be used as a precursor either before the pre-treatment of metallic surfaces of substrates prior to anodization, prior to the treatment or passivation of metallic surfaces such as e.g. parts and assemblies or prior to the cleaning in an industrial washing installation or as an intermediate cleaning stage prior to a subassembly.

The substrates cleaned using the method according to the invention may be used for anodizing, in particular for anodizing without chrome IV, alkali phosphatizing such as e.g. for iron phosphatizing, for manganese phosphatizing or for zinc phosphatizing and/or for coating with at least one treatment or pre-treatment composition on the basis of silane/siloxane/polysiloxane, titanium/zirconium compound, iron oxide/cobalt oxide, oxalate, phosphonate/phosphate and/or organic polymer/copolymer and/or for coating with at least one composition on the basis of a substantially organic, polymeric composition, with a welding primer, with a galvanic coating, with an enamel coating, with a CVD coating, with a PVD coating and/or with a temporary anti-corrosion coating.

In the following, examples will be listed that describe the production and composition of aqueous concentrates and baths produced therefrom as well as the application conditions, in order to illustrate the invention better, without limiting thereby the invention to the concrete examples.

Example 1

To a beaker with a magnetic stirrer, which contains 70.8 parts of demineralised water, 0.9 parts of 75% o-phosphoric acid are added. Subsequently, four parts of dodecylbenzene sulfonic acid are added and are homogenized by moderate stirring. The mixture is neutralised by adding 1.9 parts of 50% sodium hydroxide. 0.3 parts of pentasodium tripolyphosphate, 0.1 parts of monoethanolamine, 5 parts of Ethomeen® C/15 (produced by Akzo Nobel, cocosalkylamine ethoxylate) and 3 parts of Softanol® 70 (produced by Ineos Oxide, fatty alcohol ethoxylate), in this order, are added under constant stirring. Finally, 1 part of Dissolvine® GL 38 (produced by Akzo Nobel, glutamic acid diacetate), 8 parts of dipropylene glycol monomethyl ether and 5 parts of 2-phenoxyethanol are added to the solution. After brief post-stirring, a clear cleaner concentrate is obtained.

The obtained cleaner concentrate is diluted with water at a ratio of 1:4 for application in the submersion process and is heated to 55° C. for accelerating the cleaning process. A metal sheet provided with ink print markings (type Rca-Jet® TKO-SW 010) and permanent marker labels (type Edding® 3000) is completely submersed into the cleaner bath under gentle stirring for 15 minutes for removing the markings and labels. Upon expiration of that period of time, the metal sheet is submersed in water several times, in order to remove any adhering cleaner solution.

The ink print markings completely dissolve (100%) and the permanent marker labels are removed almost completely (70%) during the cleaning process described.

Table 1 lists further examples B2 to B9 as well as comparative examples VB1 and VB2 of cleaner formulations, which are intended to explain the subject matter of the invention. The production of the cleaner concentrate was carried out in a manner analogous to that of Example 1.

Table 2 shows the cleaning performance that was classified on the basis of a visual comparison. The evaluation of the cleaning performance was carried out by removing ink print markings and permanent marker labels. To this end, test sheets prepared in the same way were printed and/or labelled with ink and permanent marker. The applied pattern of prints and labels allowed the cleaning performance to be quantified.

TABLE 1

| Composition in wt-% | B2 | B3 | B4 | B5 | B6 | B7 | B8 | B9 | VB1 | VB2 |
|---|---|---|---|---|---|---|---|---|---|---|
| Demineralised water | 62.0 | 56.2 | 71.4 | 71.7 | 56.7 | 56.7 | 56.7 | 56.7 | 77.0 | 74.3 |
| o-phosphoric acid 75% | 0.8 | | | 0.9 | | | | | | 0.8 |
| Dodecylbenzene sulfonic acid | | | | 2.0 | | | | | | |
| Citric acid | 1.0 | | | | | | | | | |
| Caprylic acid | 3.0 | 5.0 | 10.6 | 2.0 | 7.0 | 7.0 | 7.0 | 7.0 | | 2.0 |
| Dipropylene glycol | | 15.0 | | | | | | | | |
| Potassium hydroxide solution, 50% | 5.4 | | | | | | | | 3.0 | |
| Sodium hydroxide, 50% | | | | 0.7 | | | | | | 2.5 |
| Potassium silicate solution, 30% | | | | | | | | | 10.0 | 1.0 |
| Monoethanolamine | | 1.8 | 5.0 | 0.5 | 2.7 | 2.7 | 2.7 | 2.7 | | |
| Pentasodium tripolyphosphate | 0.8 | 1 | | 0.2 | | | | | | 0.8 |
| Glutamic acid diacetate, 40% | | | 1.0 | 1.0 | 1.0 | 1.0 | 1.0 | 1.0 | 1.5 | 1.0 |
| Octylphosphonic acid | 0.2 | | | | | | | | | 0.2 |
| C$_{12}$-C$_{15}$ fatty alcohol ethoxylate | 3.0 | 3.0 | 3.0 | 3.0 | 5.0 | 5.0 | 5.0 | 5.0 | 3.0 | 2.0 |
| Coconut alkyl diethanolamide | 5.0 | 5.0 | | | | | | | | 9.0 |
| C$_9$-C$_{11}$ fatty alcohol ethoxylate | 8.0 | | | | | | | | | |
| Coconut alkylamine ethoxylate | | | | | | | | | 2.5 | |
| Glycine | 4.0 | 5.0 | 3.0 | | 5.0 | 5.0 | 5.0 | 5.0 | | |
| Dipropylene glycol monomethyl ether | 6.0 | 8.0 | 2.0 | 8.0 | 6.3 | 6.3 | | | 3.0 | 3.0 |
| Propylene glycol monobutyl ether | 3.0 | | 2.0 | | | | | | | 3.0 |
| 2-phenoxyethanol | 3.0 | | 2.0 | 5.0 | | | | | | |
| Ethylene glycol monohexyl ether | | | | | 6.3 | | | | | |
| Sodium dioctyl sulfosuccinate | | | | | | 5.0 | | | | |
| 2-ethylhexyl lactate | | | | | | | 6.3 | 6.3 | 6.3 | |
| Ethyl lactate | | | | | | | 6.0 | | | |
| n-butyl lactate | | | | | | | 0.3 | 6.3 | | |
| Neopentyl glycol | | | | | 5.0 | 5.0 | 5.0 | 5.0 | | |
| Total: | 100.0 | 100.0 | 100.000 | 100.0 | 100.0 | 100.0 | 100.0 | 100.0 | 100.0 | 100.0 |

TABLE 2

| Cleaning performance in % | B2 | B3 | B4 | B5 | B6 | B7 | B8 | B9 | VB1 | VB2 |
|---|---|---|---|---|---|---|---|---|---|---|
| Cleaning of ink Rea-Jet® TKO-SW 010 | 80 | 60 | 80 | 100 | 90 | 100 | 100 | 90 | 30 | 20 |
| Cleaning of Edding® 3000 | 60 | 40 | 70 | 70 | 70 | 100 | 100 | 60 | 0 | 10 |

The invention claimed is:

1. A detergent for the gentle removal of inks and markers from metallic surfaces in the form of a concentrate or a cleaning bath solution, characterized in that the detergent contains at least one water-immiscible solvent in an amount of 4 to 200 g/l, at least one anionic or nonionic surfactant in an amount of 8 to 300 g/l, at least one complexing agent in an amount of 1 to 100 g/l, at least one buffer substance in an amount of 1 to 100 g/l and at least one water-miscible solvent in an amount of 4-200 g/l in water.

2. The detergent as claimed in claim 1, wherein the at least one water-immiscible solvent is of the class of ester or ether compounds.

3. The detergent as claimed in claim 1, wherein the at least one water-immiscible solvent is selected from the group consisting of hydroxycarboxylic acid esters and glycol monoethers.

4. The detergent as claimed in claim 1, wherein the at least one water-immiscible solvent is a lactic acid ester of the $C_2$-$C_8$ alcohols.

5. The detergent as claimed in claim 1, wherein the at least one anionic or nonionic surfactant is an oil-in-water emulsified surfactant of nonionic surfactants or of anionic surfactants.

6. The detergent as claimed in claim 5, wherein the at least one anionic or nonionic surfactant has an HLB value in a range of 5 to 16.

7. The detergent as claimed in claim 5, wherein the at least one anionic or nonionic surfactant has HLB values of 6 to 14.

8. The detergent as claimed in claim 1, characterized in that the detergent contains at least one component for pH value stabilization.

9. The detergent as claimed in claim 1, characterized in that the detergent contains a corrosion inhibitor or at least one further additive selected from the group consisting of biocides, defoamers or pickling inhibitors.

10. The detergent as claimed in claim 1, characterized in that the overall content of all active ingredients in the cleaning bath is in a range of 10 to 200 g/l.

11. The detergent as claimed in claim 1, characterized in that when the detergent is used as a cleaning bath the detergent is diluted with water in a ratio of 1:1 to 1:20.

12. The detergent as claimed in claim 11, wherein the cleaning bath contains oils, further nonpolar organic compounds of the group consisting of fats, soaps, particle dirt or anionic organic compounds.

13. The detergent as claimed in claim 1, which can be used in cleaning process involving immersion, spraying or brushing.

14. The detergent as claimed in claim 1 for cleaning substrates having metallic surfaces of iron, steel, stainless steel, galvanized steel, metallically coated steel, aluminium, magnesium, titanium or the alloys thereof.

15. The detergent as claimed in claim 1 for cleaning substrates in the form of metal sheets, components or composite components of different substrates.

16. The use of a detergent as claimed in claim 1 for producing cleaned substrates prior to phosphating or prior to anodizing, prior to coating with a treatment or pre-treatment composition on the basis of silane/siloxane/polysiloxane, titanium/zirconium compound, iron oxide/cobalt oxide, chromate, oxalate, phosphonate/phosphate or an organic polymer/copolymer or prior to the coating with at least one composition on the basis of a substantially organic polymeric composition, with a welding primer, with a galvanic coating, with an enamel coating, with a CVD coating, with a PVD coating or with a temporary anti-corrosion coating.

17. The detergent as claimed in claim 1, wherein the at least one anionic or nonionic surfactant has HLB values of 6 to 13.

* * * * *